United States Patent
Boland et al.

(10) Patent No.: US 6,878,328 B2
(45) Date of Patent: Apr. 12, 2005

(54) METHODS FOR PRODUCING A MOLDED PART

(75) Inventors: Bernhard Boland, Frankfurt (DE); Götz Gardlo, Sulzbach (DE); Rainer Hans, Waldems (DE); Hansjörg Reick, Steinbach (DE); Armin Schwarz-Hartmann, Wendelsheim (DE)

(73) Assignee: Braun GmbH, Kronberg (DE)

( * ) Notice: Subject to any disclaimer, the term of this patent is extended or adjusted under 35 U.S.C. 154(b) by 297 days.

(21) Appl. No.: 10/308,261

(22) Filed: Nov. 27, 2002

(65) Prior Publication Data

US 2003/0080474 A1 May 1, 2003

Related U.S. Application Data

(63) Continuation-in-part of application No. PCT/EP02/02933, filed on Mar. 16, 2002.

(30) Foreign Application Priority Data

Apr. 3, 2001 (DE) .......................................... 101 16 522

(51) Int. Cl.⁷ ................................................ B28B 5/00
(52) U.S. Cl. ....................... 264/250; 264/241; 264/263; 264/265; 264/259; 264/294
(58) Field of Search ................................. 264/241, 250, 264/263, 265, 259, 294

(56) References Cited

U.S. PATENT DOCUMENTS 5,370,831 A * 12/1994 Blair et al. ................. 264/460

FOREIGN PATENT DOCUMENTS

| DE | 195 46 685 A1 | 9/1996 |
| DE | 199 04 217 A1 | 8/2000 |
| DE | 199 07 245 A1 | 8/2000 |
| EP | 1 022 116 A1 | 1/2000 |
| EP | 1 048 748 A2 | 4/2000 |

* cited by examiner

Primary Examiner—Stephen J. Lechert, Jr.
(74) Attorney, Agent, or Firm—Fish & Richardson P.C.

(57) ABSTRACT

A method for producing a plastic part having a first component and a second component connected to the first component. The method includes molding a temporary connection between the first component and a preliminary second component, coating at least a surface region of the first component, separating the first and preliminary second component, and then molding the second component to the first component. The plastic part can be an injection molded part and the components of the plastic part can be made using the same or different plastics.

46 Claims, 4 Drawing Sheets a)

b)

c)

d)

a)

b)

c)

d)

METHODS FOR PRODUCING A MOLDED PART

CROSS REFERENCE TO RELATED APPLICATION

This is a continuation-in-part of PCT application serial no. PCT/EP02/02933, filed Mar. 16, 2002, which claims priority from German application serial number 10116522.5, filed Apr. 3, 2001.

TECHNICAL FIELD

The invention relates to methods for producing a plastic part, for example an injection-molded part.

BACKGROUND

Multi-component injection-molded parts are being used increasingly frequently, for example for housings or other parts of electric toothbrushes, electric or mechanical razors, small domestic appliances, blood-pressure measuring devices, clinical thermometers or the like. In some instances, one of the components is a hard plastic and the other component is a soft plastic. The soft plastic component can, for example, form a membrane on the housing of a hard plastic, serve for the actuation of a switch accommodated in the housing, or be formed as a gripping surface on a hard plastic part. Soft plastic components of this type are frequently molded onto a hard plastic housing to improve the handling or grip.

Compact bodies are also used as multi-component injection-molded parts. In cases where one of these components has a coating, special difficulties can arise. For example, when the coating is applied prior to the molding-on of the second component, it can be difficult to effect an intimate connection between the first component and the second component during the injection-molding operation. Such problems can occur, for example, if the a surface portion (e.g., the upper face) of the first component (e.g., a hard plastic) is provided with a metallic coating, followed by molding a second component (e.g., a soft plastic) onto the first component (e.g., by injection-molding), wherein a permanent connection is produced between the first component and the second component. The metallic layer generally prevents an intimate connection between the coated first component and the second component, so that the second component cannot permanently adhere to the first component. One can, for example, mechanically cover the connecting points between the first component and the second component during the coating of the first component. However, permanently connecting the second component to the covered, and uncoated, region of the first component (e.g., using injection-molding), generally results in surface defects at the transitional points between the coated first component and the non-coated second component.

SUMMARY

Herein is provided methods of producing a plastic part, where an intimate connection between a coated first component and a second component is accomplished using injection-molding, such that surface defects at the transitional points can be generally avoided.

In several aspects, the invention features a method for producing a plastic part having first and second molded components. One method includes molding the first component in a first mold and forming a preliminary second component temporarily connected to the first component. At least a surface region of the first component adjacent to the preliminary second component is coated, and, after coating, the preliminary second component is removed to expose an uncoated surface of the first component. After removing the preliminary second component, the coated first component is placed in a second mold; and then the second component is molded onto the exposed, uncoated surface of the first component.

In another aspect of the invention, the method includes molding the first component in a first mold, and forming a preliminary second component temporarily connected to the first component. At least a surface region of the first component adjacent to the preliminary second componen is treated, and after treating, the preliminary second component is removed to expose an uncoated surface of the first component. After removing the preliminary second component, the treated first component is placed in a second mold, and then the second component is molded onto the exposed, untreated surface of the first component.

In some embodiments, the coating is a metallization, or is formed by a metallization, and can be applied galvanically, chemically, physically or using paints, varnishes or other similar finishes. The coating can be applied onto an upper face, for example the upper face of the first component. By applying a metallic coating to the plastic component, the plastic part can be provided with a high-quality appearance. Furthermore, surface defects at the transitional points of the individual components can be essentially avoided, especially when the plastic part is a multi-component injection-molded part.

In some embodiments, the preliminary second component and the second component are essentially identical with regard to the geometrical dimensions, such as thickness, shape, and contour. Causing the preliminary second component and the second component to have essentially identical geometries allows the contact regions of the first component and preliminary second component to be reliably covered during the coating operation. Thus, these regions enter into an intimate connection with each other when the second component is attached while avoiding surface defects, leakages, or other undesirable effects.

In some cases, the first injection mold and the second injection mold are identical. In some other cases, the first injection mold and the second injection mold differ by only the thickness of the coating applied to the first component.

In some instances the thickness of the first coating is adequately thin, that the preliminary second component and the second component can be molded onto the first component (e.g., by means of injection-molding) in the same mold, preferably in a multi-component injection mold. If, however, the thickness of the coating exceeds a certain amount, a second injection mold can be required for the molding of the second component onto the first, coated component.

In some other embodiments, the preliminary second component and the second component are formed having different geometrical dimensions, such as thickness, shape, contour, etc. For example, the preliminary second component can be formed exclusively as a layer for coating the contact regions of the first component with the second component, wherein this layer is not placed on the first component during the coating operation, but is rather molded on using injection-molding. Furthermore, this aspect features the advantage of, under some circumstances, saving material required to produce the preliminary second component, which is merely molded on the first component in an intermediate step and, after the coating of the first component, is removed. It is thus not required for the preliminary second component to fill all the volumes which are later taken up by the second component; rather, the task of the preliminary second component is merely to cover the eventual contact regions between the first component and the second component during the coating operation.

In some instances, the first and second components have different geometrical dimensions, and the first and second injection molds can be formed in a correspondingly different manner.

In some cases the second preliminary component is, mechanically separated from the first component, partially chemically dissolved, or chemically dissolved completely.

In some instances, the plastic for forming the preliminary second component has different properties in comparison with the plastic for forming the second component. For example, by the selection of different types of plastic (i.e., resin), the adhesion properties of the preliminary second component or second component with the first component can be correspondingly adjusted (e.g., allowing only slight adhesion of the preliminary second component and very intimate and permanent adhesion of the second component with the first component).

The methods described herein can produce an intimate connection between a first component, having a coating, and a second component, wherein surface defects do not occur at the transitional points. Because the preliminary second component is not permanently connected to the first component (e.g., by means of injection-molding) before application of the coating of the first component, the preliminary second component serves as a covering for the regions of the first component that come into contact and enter into a connection with tie second component during the final molding-on of the second component. Additionally, because the preliminary second component serves as a covering of the first component by being molded onto the first component in a manner similar to the final second component, the surfaces of the first component that come into contact with the second component are reliably covered during the coating of the first component. Thus, after the subsequent removal of the preliminary second component from the first component, which is already coated, the contact regions between the first component and the second component are free of the coating, and the second component can be permanently molded onto the first component, without the occurrence of surface defects.

The injection molds described herein can be designed in a way corresponding to the individual needs of the multi-component injection-molded part to be produced. Depending on the injection-molded part to be produced, two component injection molds or other injection molds, as known to one skilled in the art, can be used. Many different variations of plastics can be used with respect to the first component, the preliminary second component, and the second component. For example, hard/hard, hard/soft, and soft/soft combinations of plastic can be used. Examples of hard plastics include ASA, ABS or other similar plastics, and examples of soft plastics include TPE, e.g. DESMOPAN. The coating can be on the outer face and/or on an inner face of the first component of the injection-molded part. For example, where the first component is a housing, the coating can be on the inner face. Furthermore, the properties of the preliminary second component, and the second component are essentially determined by the requirements resulting from the individual selection and adaptation of the plastics making up the first component.

Formation of the respective multi-component injection-molded parts can be carried out by the competent plastics expert. The application of the coating to the first component can be accomplished in a variety of ways, for example by an electrolytic bath, by painting or varnishing, by dipping, spraying or other similar methods.

Further features, advantages, application possibilities and refinements of the invention emerge from the following description of the exemplary embodiments and from the figures. All the features described and/or graphically presented form the subject-matter of the present invention either alone or in meaningful combination, regardless of how they are combined in the claims or in the way the claims relate back to one another. Other features, objects, and advantages of the invention will be apparent from the claims.

Figure 1:
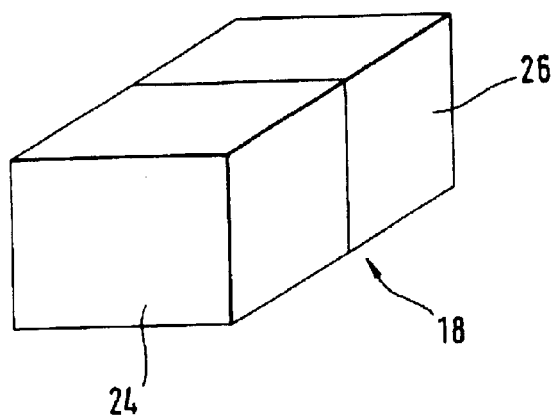
FIGS. 1a–d depict a schematic representation of a method of making a cuboidal, solid multi-component injection-molded part.
Figure 1:
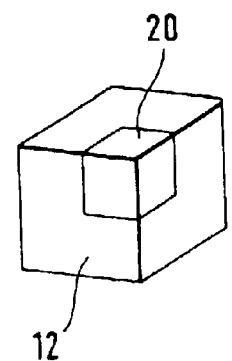
Figure 1:
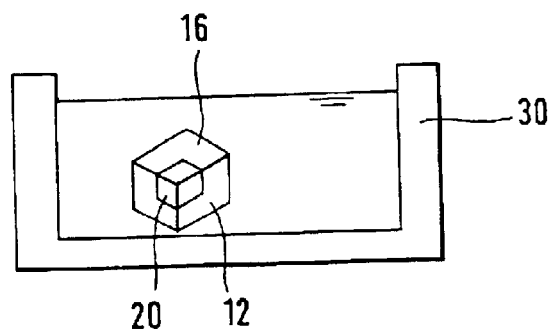
Figure 1:
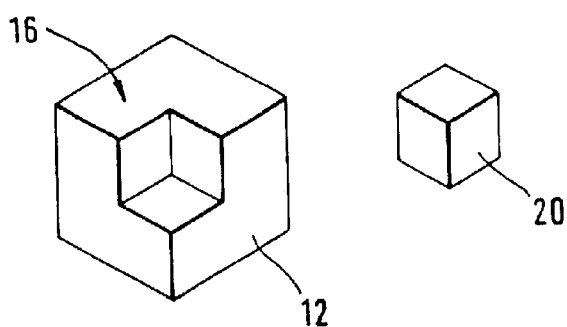
Figure 1:
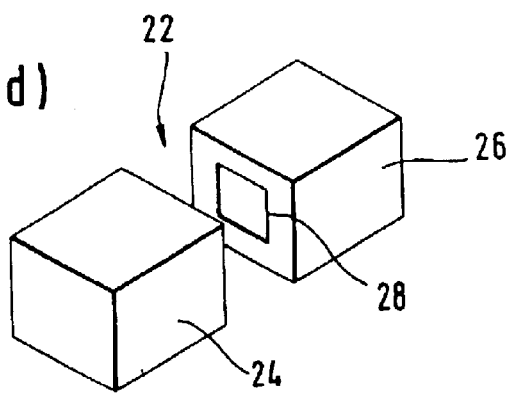
Figure 1:
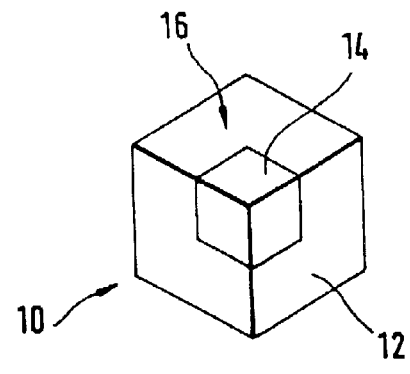

| List of reference numerals: | |
| --- | --- |
| 10 | injection-molded part |
| 12 | first component |
| 14 | second component |
| 16 | coating |
| 18 | injection mold |
| 20 | preliminary second component |
| 22 | second injection mold |
| 24 | mold half |
| 26 | mold half |
| 28 | cavity |
| 30 | coating device |
| 32 | ultraviolet lamp |
| 34 | laser |

Like reference symbols in the various drawings indicate like elements.

DETAILED DESCRIPTION

Figure 2:
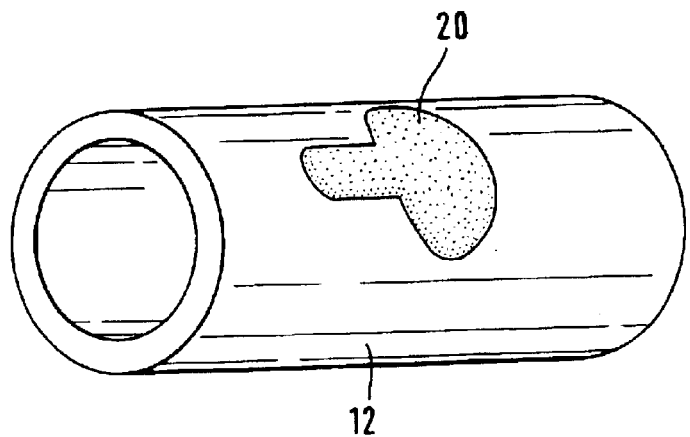
FIGS. 2a–d depict a schematic representation of a method of making a tubular, housing-like multi-component injection-molded part.
Figure 2:
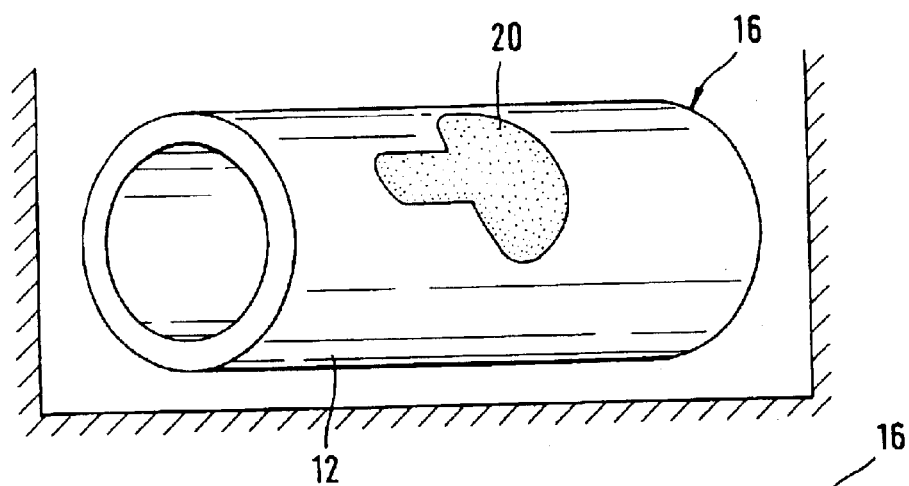
Figure 2:
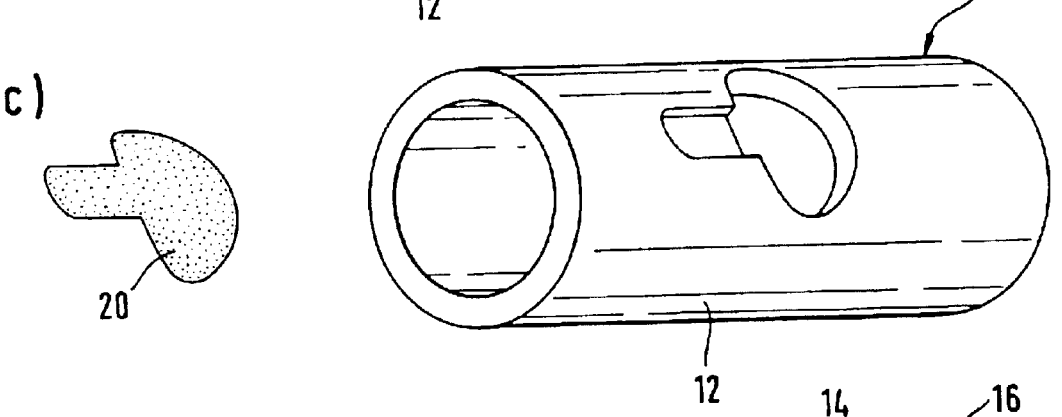
Figure 2:
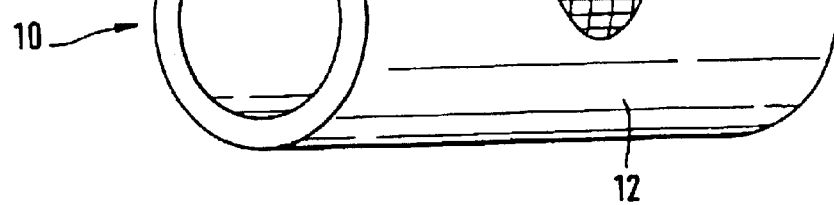

FIGS. 1 and 2 illustrate two exemplary embodiments of the methods described herein. FIGS. 1d and 2d depict an injection-molded part, 10, made by the methods described herein. The multi-component injection-molded part, 10, has at least a first component, 12, and a second component, 14, connected to the first component. The two components, 12 and 14, are formed using the same or different plastics as desired. The first component, 12, in some instances has a coating, 16, of an upper face. However, the first component can also have a coating of a lower face or an inner face (e.g., wherein the injection-molded parts are formed in a housing-like manner). The second component, 14, is not provided with coating, 16, of the first component, 12, but can instead have a different type of coating.

As shown in FIGS. 1a and 2a, the injection-molded part, 10, is produced by injection-molding, using a first injection mold, 18, having first and second mold halves, 24 and 26, with corresponding cavities, 28. The connection between the first component, 12, and a preliminary second component, 20, is not made permanent, but rather adheres only slightly.

FIGS. 1b and 2b depict, the injection-molded part, 10, comprising the first component, 12, and the preliminary second component, 20, wherein the molded part is provided with a coating, 16, in a coating device (e.g., an electrolytic bath, a varnishing device, etc.). As depicted, the coating can be on the upper face (FIG. 1b) and/or the lower face (FIG. 2b). This coating, 16, can also be formed on the preliminary second component, 20, which can depend on the material of the preliminary second component, 20.

As seen in FIGS. 1c and 2c, the preliminary second component, 20, is separated firm the first component, 12. In this case, the contact regions between the preliminary second component, 20, and the first component, 12, are free of the coating, 16, since the preliminary second component, 20, serves as a covering for these contact regions.

Finally, FIGS. 1d and 2d depict the second component, 14, as it is permanently connected (e.g., by injection-molding) to the first component, 12, in a second injection mold, 22, such as in an over-molding operation.

Figure 3:
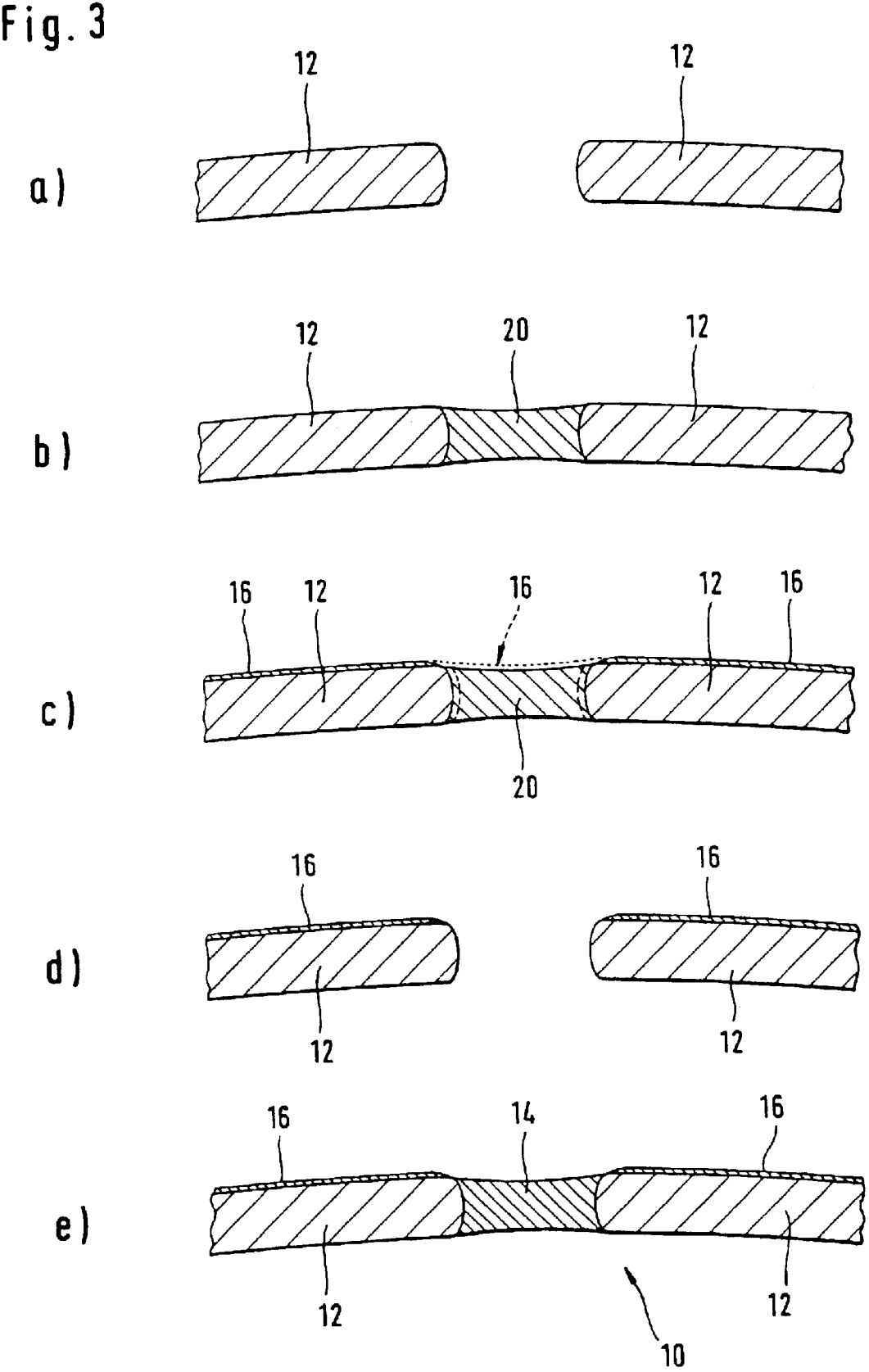
FIGS. 3a–e depict a schematic representation of a method of making a multi-component molded part using sectional representations through the wall of a housing-like multi-component injection-molded part.

In FIG. 3, the individual steps of the method according to one embodiment are represented in more detail. FIG. 3a depicts the first component, 12, which is formed as a wall with an opening. The preliminary second component, 20, is then introduced into the opening of the first component, 12, by injection-molding, such that the preliminary second component, 20, enters into a non-permanent, preferably slightly adhering, connection with the first component, 12. Subsequently, the coating, 16, is applied to the first component, 12, and in some instances, also to the preliminary second component, 20, as indicated by the dotted arrow, 16. It can be seen from FIG. 3c that the contact regions between the preliminary second component 20, and the first component, 12, are adequately covered and are free of the coating, 16.

Represented in FIG. 3d is the first component, 12, with the coating, 16, on the upper face after removal of the preliminary second component, 20. The second component, 14, is then introduced into the opening of the first component, 12, using injection-molding, such that the first component and second component, 14, are permanently connected. A permanent connection is accomplished due to the contact areas between the second component, 14, and the first component, 12, being free of the coating, 16. Since the contact region between the preliminary second component, 20, and the first component, 12, and between the second component, 14, and the first component, 12, are virtually identical, (e.g., set by means of the injection mold (e.g., 18 or 22)), surface defects at the transitional points between the first component, 12, and the second component, 14, can be avoided. Note, FIG. 3 is a pictorial representation and accordingly is not true to scale. In particular, the thickness of the coating, 16, is shown enlarged in comparison with the thickness of the first component, 10, and the second component, 14.

The coating, 16, may be formed by a metallization or include a metallization, and can be applied onto a surface, for example galvanically, chemically, physically or by means such as paint or varnish. The preliminary second component, 20, and the second component, 14, can be essentially identical with regard to the geometrical dimensions (e.g., thickness, shape, or contour), as shown in the figures. Thus, the first and second injection molds (e.g., 18 and 22) can also be identical or, taking into consideration the thickness of the coating, 16, of the first component, 12, essentially identical.

Additionally, the preliminary second component, 20, and the second component, 14, can be formed differently with regard to the geometrical dimensions, such as thickness, shape, or contour. For example, FIG. 1 depicts the contact area between the component, 12, and the component, 14. This contact area can be covered merely by a sheet-like (thin) layer of the preliminary second component, 20, which also ensures that the later contact area is not subjected to the coating, 16. FIG. 3, in particular FIG. 3c, depicts an example wherein the preliminary second component can be formed merely as a layer in the region of the eventual contact area between the first component, 12, and the second component, 14, as shown in FIG. 3e (See the dashed lines in FIG. 3c). As depicted in FIGS. 1 and 3, the injection molds, 18 and 22, can be differently formed. Furthermore, the preliminary second component, 20, is mechanically separated from the first component, 12, after the application of the coating, 16, on the first component, 12. This mechanical separation can be preceded by partially chemical dissolving the preliminary second component. Alternatively, the preliminary second component, 20, can also be chemically dissolved completely. The plastic for forming the preliminary second component, 20, and the second component, 14, can have different properties. In some cases the individual adhesion properties on the first component, 12, are suitably compatible to those of the preliminary second component and the second component.

Figure 4A:
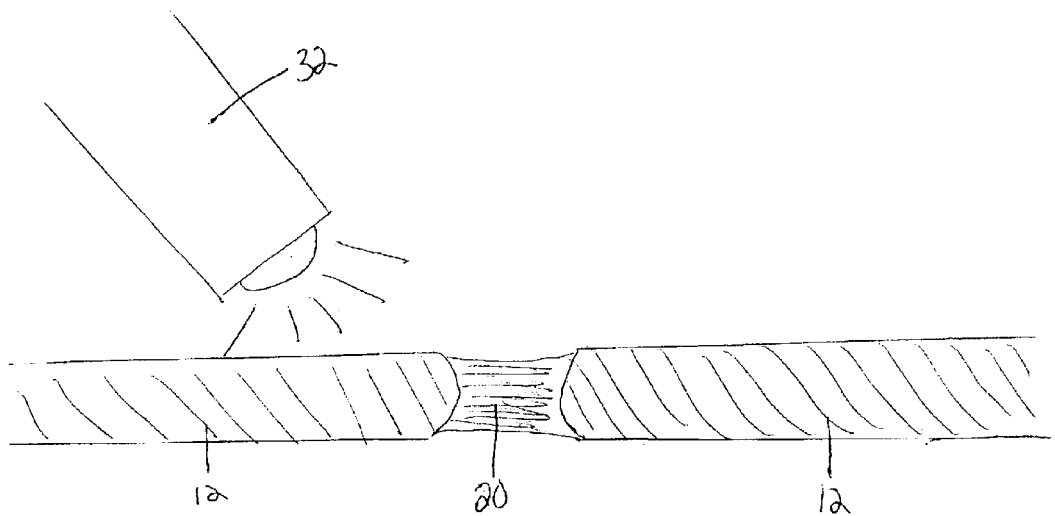
FIGS. 4a–b depict representations of methods of treating a multi-component molded part using an ultraviolet lamp and using a laser.
Figure 4B:
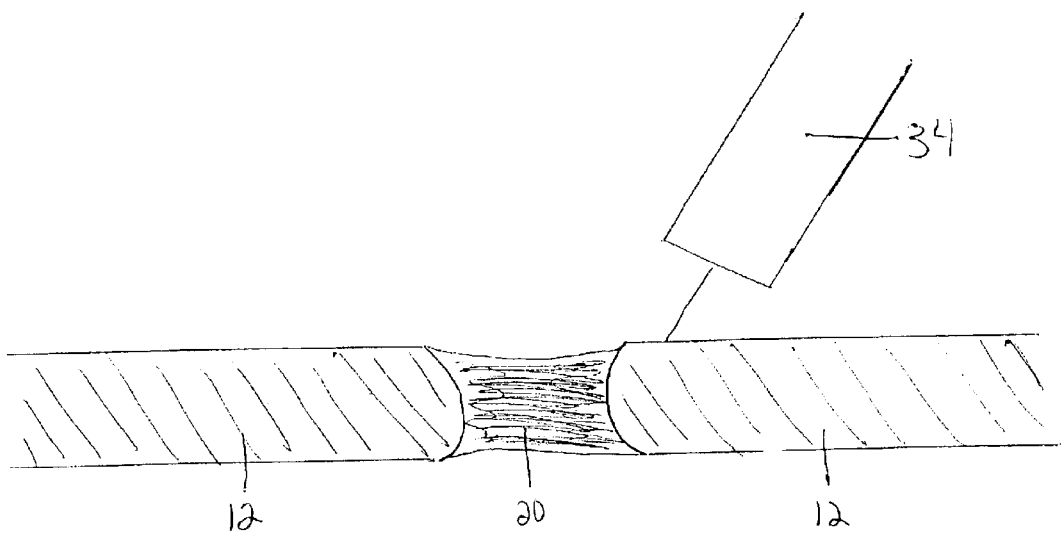

The above-described methods can also employ other treatment processes of the first component while the preliminary second component is in place. For example, the surface of the first component can be treated by exposing the surface to an etchant, or a laser, or an anodizing treatment, or a light source (e.g., a UV lamp), such as to promote cross-linking, or to beadblasting, such as to create a rough surface texture. FIGS. 4a and 4b depict two methods of treatment wherein the first component, 12, is be treated while molded to the preliminary second component, 20, for example with an ultraviolet lamp, 32, as shown in FIG. 4a or with a laser, 34, as shown in FIG. 4b.

A number of embodiments of the invention have been described. Nevertheless, it will be understood that various modifications may be made without departing from the spirit and scope of the invention. Accordingly, other embodiments are within the scope of the following claims.

What is claimed is:

1. A method for producing a plastic part having a first and second molded components, the method comprising:
   (a) molding the first component in a first mold;
   (b) forming a preliminary second component temporarily connected to the first component;
   (c) coating at least a surface region of the first component adjacent to the preliminary second component;
   (d) after coating, removing the preliminary second component to expose an uncoated surface of the first component;
   (e) after removing the preliminary second component, placing the coated first component in a second mold; and then
   (f) molding the second component onto the exposed, uncoated surface of the first component.

2. The method of claim 1, wherein the second mold is also the first mold.

3. The method of claim 1, wherein the first mold is an injection mold, molding the first component comprising injecting a first resin into the first mold.

4. The method of claim 1, wherein the second mold is an injection mold, molding the second component comprising injecting a second resin into the second mold.

5. The method of claim 1, wherein the first and second molds are injection molds, molding the first component comprising injecting a first resin into the first mold and molding the second component comprising injecting a second resin into the second mold.

6. The method of claim 1, wherein forming the preliminary second component comprises molding the preliminary second component while the first component remains in the first mold.

7. The method of claim 1, wherein the first component and the second component are molded of different resins.

8. The method of claim 1, wherein the first component and the second component are molded of the same resin.

9. The method of claim 1, further comprising coating the second component.

10. The method of claim 1, wherein coating the surface region includes coating at least a portion of the preliminary second component.

11. The method of claim 1, wherein coating the surface region comprises metallizing the surface region.

12. The method of claim 11, wherein metallizing includes depositing a metal-containing coating galvanically, chemically, or physically.

13. The method of claim 11, wherein coating the surface region comprises depositing a paint or a varnish.

14. The method of claim 1, wherein the preliminary second component and the second component are of essentially identical geometric dimensions.

15. The method of claim 1, wherein the first and second molds each define identical mold cavities.

16. The method of claim 15, wherein the first and second molds are injection molds, molding the first component comprising injecting a first resin into the first mold and molding the second component comprising injecting a second resin into the second mold.

17. The method of claim 1, wherein the first and second molds define cavities that differ only by a thickness of the coating of the first component.

18. The method of claim 1, wherein the preliminary second component and the second component are of different geometrical dimensions.

19. The method of claim 18, wherein the preliminary second component is formed to a thickness different than that of the second component.

20. The method of claim 18, wherein the preliminary second component is formed to a contour different than that of the second component.

21. The method of claim 1, wherein the preliminary second component is removed mechanically.

22. The method of claim 1, wherein removing the preliminary second component includes chemically dissolving at least part of the preliminary second component.

23. The method of claim 22, wherein the preliminary second component is removed by chemically dissolving all portions of the preliminary second component in contact with the first component.

24. The method of claim 1, wherein the preliminary second component and the second component are formed of resins having different properties.

25. The method of claim 1, wherein the first component comprises a housing of an electric toothbrush.

26. The method of claim 1, wherein the first component comprises a housing of an electric or mechanical razor.

27. The method of claim 1, wherein the first component comprises a housing of a small domestic appliance.

28. The method of claim 1, wherein the first component comprises a housing of a blood-pressure monitoring device.

29. The method of claim 1, wherein the first component comprises a housing of a clinical thermometer.

30. The method of claim 1, wherein the second component is formed of a softer material than the first component.

31. The method of claim 1, wherein the second component is molded to fill a hole defined through the first component.

32. The method of claim 1, wherein the second component is molded to fill a recess defined in a surface of the first component.

33. The method of claim 1, wherein the coating includes coating essentially all exposed surfaces of the first component.

34. The method of claim 1, wherein the resin forming the preliminary second component is selected to form only an impermanent bond to the resin forming the first component.

35. The method of claim 1, wherein the coating includes spraying a material onto the surface region.

36. A method for producing a plastic part having a first and second molded components, the method comprising:
 (a) molding the first component in a first mold;
 (b) forming a preliminary second component temporarily connected to the first component;
 (c) treating at least a surface region of the first component adjacent to the preliminary second component;
 (d) after treating, removing the preliminary second component to expose an uncoated surface of the first component;
 (e) after removing the preliminary second component, placing the treated first component in a second mold, and then
 (f) molding the second component onto the exposed, untreated surface of the first component.

37. The method of claim 36, wherein treating includes coating the surface region of the first component.

38. The method of claim 36, wherein treating includes immersing the first component in a bath of fluid.

39. The method of claim 38, wherein the bath of fluid is an electrolytic bath.

40. The method of claim 38, wherein the fluid is a paint or varnish.

41. The method of claim 36, wherein the treating includes exposing the surface region to an etchant.

42. The method of claim 36, wherein the treating includes exposing the surface to a laser.

43. The method of claim 36, wherein the treating includes exposing the surface to an anodizing agent.

44. The method of claim 36, wherein the treating includes exposing the surface to a light source.

45. The method of claim 44, wherein the light source promotes cross-linking.

46. The method of claim 44, wherein the light source is an ultraviolet lamp.

* * * * *